US009103405B2

(12) United States Patent
Smetz et al.

(10) Patent No.: US 9,103,405 B2
(45) Date of Patent: Aug. 11, 2015

(54) TENSIONING DEVICE FOR CHAINS

(75) Inventors: Reinhard Smetz, Nordlingen (DE);
Michael Betzler, Abtsgmund (DE)

(73) Assignee: RUD Ketten Rieger & Dietz GmbH u. Co. KG, Aalen (DE)

( * ) Notice: Subject to any disclaimer, the term of this patent is extended or adjusted under 35 U.S.C. 154(b) by 347 days.

(21) Appl. No.: 13/066,014

(22) Filed: Apr. 4, 2011

(65) Prior Publication Data

US 2011/0253956 A1  Oct. 20, 2011

(30) Foreign Application Priority Data

Apr. 15, 2010  (DE) .................. 10 2010 015 266

(51) Int. Cl.
*F16G 11/12* (2006.01)
*F16B 39/12* (2006.01)
*F16G 3/00* (2006.01)

(52) U.S. Cl.
CPC ............. *F16G 3/006* (2013.01); *F16B 39/12* (2013.01); *F16G 11/12* (2013.01)

(58) Field of Classification Search
CPC .......... F16G 11/12; F16B 39/08; F16B 39/12; F16B 39/122; B66F 3/36
USPC ............... 269/184–186, 2; 411/118, 221; 464/137, 138; 254/98, 100, 102
See application file for complete search history.

(56) References Cited

U.S. PATENT DOCUMENTS

| 1,374,963 | A | * | 4/1921 | Stevenson | 403/44 |
| 2,790,658 | A | * | 4/1957 | Robinson | 403/44 |
| 2,966,187 | A | * | 12/1960 | Ter Cock | 411/330 |
| 4,274,754 | A | * | 6/1981 | Cohen | 403/14 |
| 5,765,957 | A | | 6/1998 | Connell | |
| 6,976,817 | B1 | * | 12/2005 | Grainger | 411/204 |
| 7,048,071 | B1 | * | 5/2006 | Huenink et al. | 172/439 |
| 7,219,951 | B2 | * | 5/2007 | Rasmussen | 296/156 |
| 2011/0176884 | A1 | | 7/2011 | Ruan | |

FOREIGN PATENT DOCUMENTS

| DE | 720 193 | 4/1942 |
| DE | 102 61 703 | 7/2004 |
| DE | 10 2008 012 293 | 9/2009 |
| EP | 0 848 189 | 6/1998 |
| EP | 1435310 | 12/2003 |
| EP | 1460306 | 9/2004 |

(Continued)

*Primary Examiner* — Lee D Wilson
*Assistant Examiner* — Jamal Daniel
(74) *Attorney, Agent, or Firm* — Mark P. Stone

(57) ABSTRACT

The invention relates to a tensioning device (1) for chains, having a spindle body (2) which is provided with at least one spindle thread (11), and with at least two coupling elements (3, 4), wherein at least one coupling element (3, 4) comprises a coupling thread (3b, 4b) screwed to the spindle thread (11), and with a securing element (5) which is embodied to be transferable from a release position, in which the coupling thread (3b, 4b) can be rotated with respect to the spindle thread (11), to a securing position, in which a rotation of the coupling thread (3b, 4b) with respect to the spindle body (2) is blocked in a form-fitting manner. To provide a tensioning device with an easily operatable and secure release protection, the tensioning device (1) comprises at least one securing element (5) which creates a positive rigid body coupling between the at least one coupling element (3, 4) provided with a coupling thread (3b, 4b) and the spindle body (2) in the securing position.

20 Claims, 12 Drawing Sheets

(56) References Cited

FOREIGN PATENT DOCUMENTS

| EP | 1 588 975 | 10/2005 |
| EP | 1 671 527 | 6/2006 |
| FR | 2205152 | 5/1974 |
| JP | 9158915 | 6/1997 |

* cited by examiner

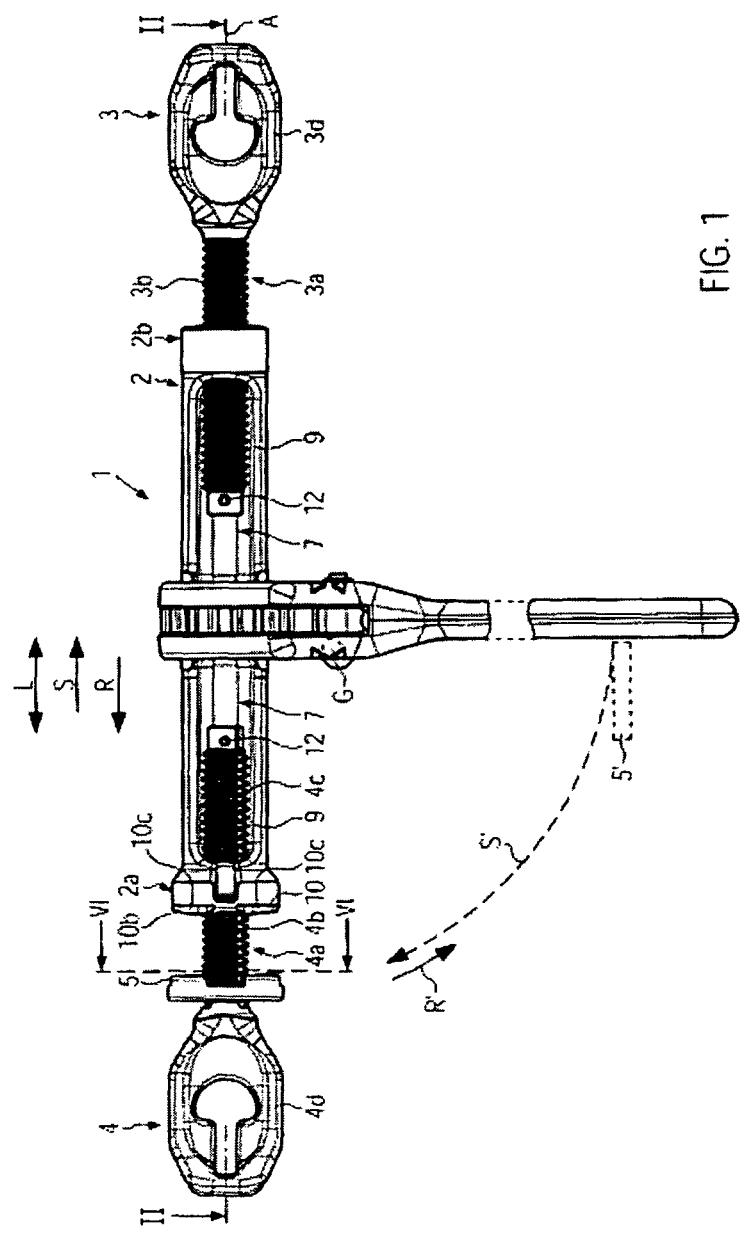

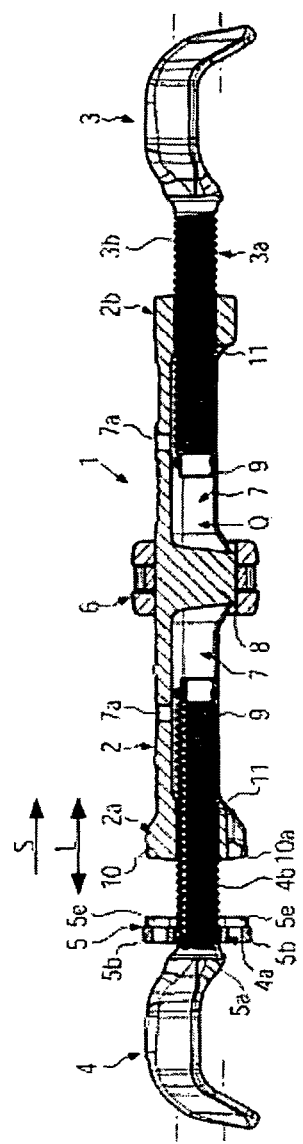
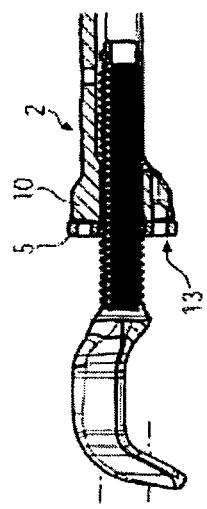

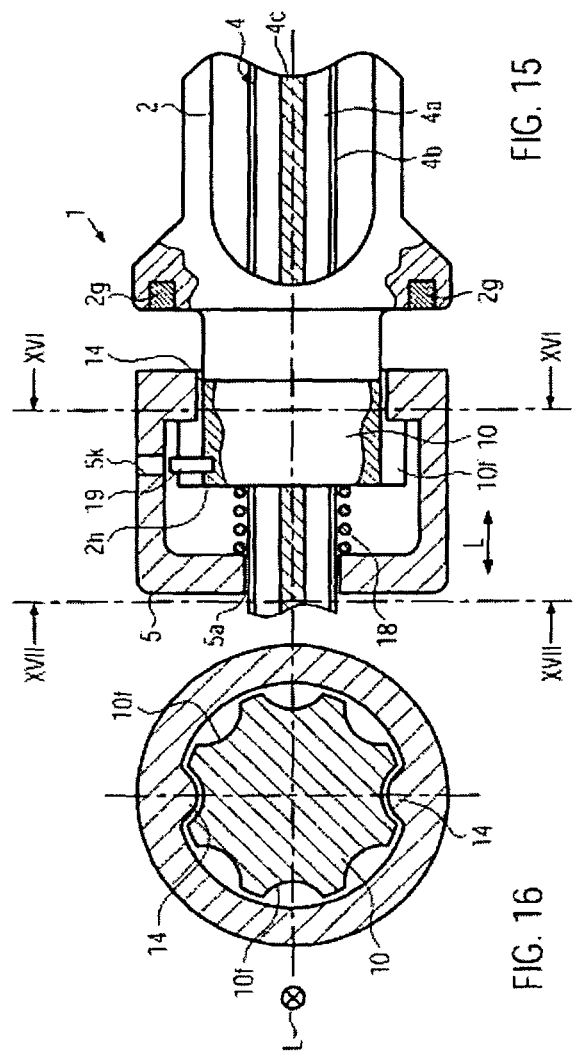
FIG. 15
FIG. 16
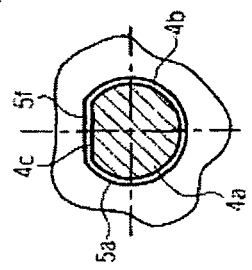
FIG. 17

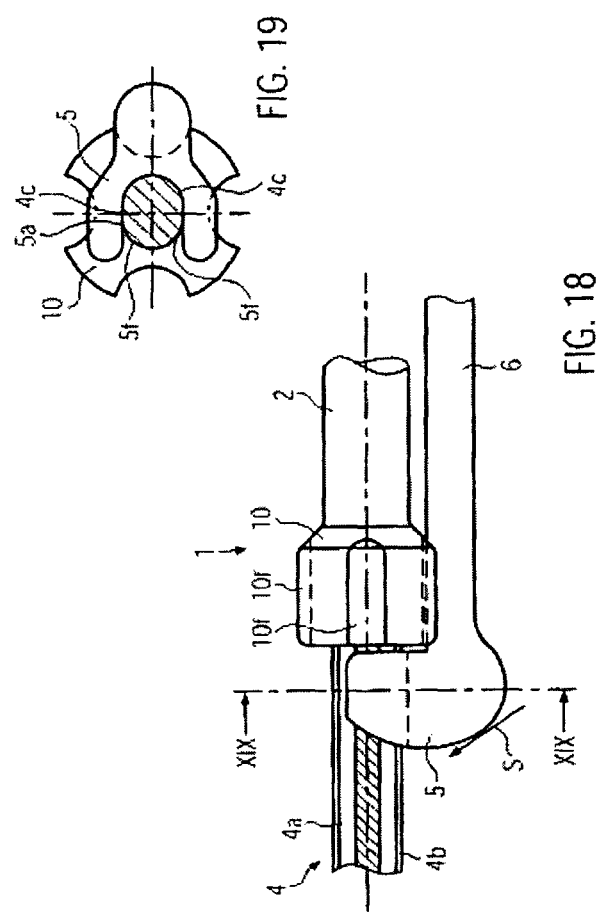

TENSIONING DEVICE FOR CHAINS

The invention relates to a tensioning device for chains with a spindle body provided with at least one spindle thread, with at least two coupling elements, where at least one coupling element comprises a coupling thread screwed to the spindle thread, and with a securing element which is designed to be transferable from a release position, in which the coupling thread can rotate with respect to the spindle thread, to a securing position, in which rotation of the coupling thread with respect to the spindle body is blocked in a form-fitting manner.

Tensioning devices of the type mentioned above are known from prior art. EP 1460306 A1, for example, shows a tensioning device for chains comprising a bolt-like, rotationally symmetric spindle body provided with external threads at its opposed ends. Coupling elements are screwed onto the external threads of the spindle body and can be designed as a shortening claw or shortening hook for connection with a chain.

To increase or reduce the distance between the coupling elements by rotating the spindle body, the threads at the ends of the spindle body are usually designed to run in opposite directions. A lever for applying a moment can be fixed to the spindle body to rotate the spindle body and thus move the coupling elements at its ends away from the spindle body or towards the spindle body. The lever can, for example, be inserted in a through opening of the spindle body or grip around the spindle body. Furthermore, ratchet mechanisms are known which release a rotation of the lever about the spindle body opposite to a direction of actuation and block it in a direction of actuation.

Another example of a known tensioning device for chains is shown in FR 2205152. The operating lever of the shown tensioning device is connected to the spindle body via a swivel joint. After operation of the tensioning device, the lever can thus be turned or oriented according to the longitudinal extension of the tensioning device to avoid an unintentional actuation of the tensioning device and reduce the space required for the tensioning device.

Tensioning devices of the type mentioned above are used, for example, for tying down loads of heavy goods, such as construction machines on floors of trucks. After two sections of a chain or two chains have been inserted into the coupling elements, the one or the two chains can be tensioned by rotating the spindle body with respect to the coupling elements. To avoid an unintentional release of the tensioning device, which can in particular occur in case of shocks and vibrations by unintentional rotation of the coupling elements out of the spindle body, release locks are employed. The latter usually consist of a securing chain fixed to a coupling element which secures the coupling element at the spindle body against unscrewing by winding the chain around the operating lever. It is complicated to operate such release locks. Therefore, the risk of operating errors is high. It often cannot be avoided that the coupling elements get slightly unscrewed from the spindle body.

Consequently, it is the object of the invention to provide a tensioning device for chains which can be easily and reliably secured against being unintentionally released.

According to the invention, this object is achieved for a tensioning device of the type mentioned in the beginning by the securing element creating a positive rigid body coupling between the at least one coupling element provided with a coupling thread and the spindle body in the securing position.

The securing element thus forms a rigid body or a rigid, non-deformable coupling which is coupled to the coupling element and to the spindle body in a form-fitting manner. By the positive engagement of the securing element, no more complicated assembly procedures are required for securing the tensioning device, such as winding around a securing chain. Instead, the securing element, which is preferably formed by an essentially rigid body, can be transferred to the securing position by a simple movement which creates the form-fit, for example a displacement or rotation. The operating facility of the tensioning device is thus improved and the risk of operating errors reduced.

The tensioning device according to the invention can be further developed by various embodiments independent of each other which are each advantageous taken by themselves. These embodiments and the advantages related to each of the embodiments will be briefly discussed below.

According to a first advantageous embodiment of a tensioning device, the securing element can be guided at the tensioning device to be movable between the securing position and the release position. The tensioning device can be lockable by the guided movement of the securing element alone. The locking of the tensioning device after a secured load has been tied down is thus further facilitated. As the movement of the securing element is guided, the probability of maloperations is reduced.

According to a further advantageous embodiment of a tensioning device, the securing element can be arranged on a coupling element to be torsionally rigid and movable in a longitudinal direction in the release position. Thus, the securing element can be transferred to the securing position by shifting it on the coupling element in the direction of the spindle body to a position in which the securing element can engage in the spindle body in a form-fitting and in particular torsionally rigid manner.

In the securing position, the securing element is preferably arranged between the spindle body and the coupling element. Preferably, the securing element is directly adjacent to the spindle body and the coupling element in the securing position. Furthermore, the securing element can support itself at the spindle body in a form-fitting manner. For a positive cooperation of the spindle body and the securing element, the securing element can engage in the spindle body and/or the coupling element in a form-fitting manner and/or be connected to the spindle body and/or the coupling element by additional connecting elements in a form-fitting manner.

To connect the securing element with the coupling element in a torsionally rigid manner, the coupling thread and the securing element can comprise retaining profiles extending in the longitudinal direction which are not circularly symmetric with respect to a longitudinal axis of the coupling thread, where the retaining profiles are engaged in a torsionally rigid manner. "Not circularly symmetric" means that a rotation of a retaining profile about the longitudinal axis does not map the retaining profile onto itself at any arbitrary angle of rotation. At certain angles of rotation, for example at 180°, however, the retaining profiles can map onto themselves. For example, the coupling thread can be provided with an indentation which extends in the longitudinal direction. The securing element can be embodied with a prolongation embodied to be complementary to the indentation which engages in the indentation and secures the securing element against rotation. Preferably, the retaining profiles are embodied to be symmetric to at least one plane of symmetry lying on a longitudinal axis or an axis of symmetry of the coupling thread to avoid jamming of the retaining profiles.

According to a further advantageous embodiment of a tensioning device according to the invention, the coupling thread and the securing element can comprise not circularly symmetric retaining profiles which extend in the longitudinal direction and are embodied to be complementary with respect to each other and lie one inside the other. For example, indentations or plain surfaces can be provided at the coupling thread and the securing element.

Thus, simple geometries of the coupling thread and the securing element can ensure that a displacement of the securing element in the longitudinal direction or in the direction of the spindle body is allowed, while rotation about an axis extending in the longitudinal direction is blocked.

In a further advantageous embodiment of a tensioning device according to the invention, the retaining profile of the coupling thread can be formed by a threaded bolt, and the retaining profile of the securing element can be formed by an opening receiving the threaded bolt. For example, the securing element can be embodied like a disk and be arranged on the threaded bolt to be movable in the longitudinal direction. For an inexpensive manufacture, the securing element can be formed from a sheet metal.

To ensure that the securing element does not slip into the coupling thread or wedges with the coupling thread, the thickness of the securing element is preferably greater than the pitch of the thread at least in its region adjacent to the threaded bolt. Thus, the surface of the opening of the securing element pointing inwards can function as a guiding element which permits the securing element to slide over the thread.

To create a torsionally rigid connection between the securing element and the threaded bolt, the opening of the securing element and the threaded bolt can each be provided with at least one or each with at least two positive locking members, where the positive locking members of the opening and the threaded bolt are arranged parallel to each other. Thus, the engaged retaining profiles of the coupling thread and the securing element can be manufactured in a very simple manner.

Engaged positive locking members of the securing element and the threaded bolt can be embodied as flattenings, indentations and/or prolongations. Preferably, the positive locking members of the securing element and/or the coupling element form a symmetric retaining profile. As an alternative or in addition, the positive locking members can be arranged to be symmetric with respect to a common axis of symmetry or a longitudinal axis of the coupling thread to avoid jamming of the securing element during a displacement of the securing element on the threaded bolt.

For a positive connection of the securing element with the spindle body in the securing position, the securing element and the spindle body can comprise engagement faces which extend parallel to each other and inclined with respect to the longitudinal direction, and which lie one upon the other in the securing position of the securing element.

To ensure a more stable positive lock between the securing element and the spindle body, a plurality of engagement faces can be provided which are arranged in the securing position so as to lie one upon the other. As an alternative or in addition, the securing element can comprise at least one positive locking element which, in the securing position, is engaged with a complementarily embodied positive locking element of the spindle body in a form-fitting manner.

In a further advantageous embodiment of a tensioning device according to the invention, positive locking elements of the securing element and the spindle body can comprise prolongations and/or recesses arranged symmetrically to a longitudinal axis of the coupling thread which are engaged in the securing position. By the symmetric arrangement with respect to the longitudinal axis, the securing element can be arranged in a plurality of angular positions at the spindle body in the securing position. Thus, the angular position of the coupling elements and thereby the applied tension can be adjusted more precisely. For example, the positive locking element of the securing element can be embodied to be cross-shaped and symmetric to the longitudinal axis of the coupling thread. The positive locking element of the securing element can be shaped as a cross-shaped indentation in which at least one prolongation embodied to be complementary to an indentation or a complementarily embodied plurality of prolongations of the spindle body can be received.

To ensure the secure function of the tensioning device in particular in rough environments where the risk of soiling or icing is increased, angles formed by the positive locking elements can be increased and in particular be greater than 90°. A cross-shaped embodied positive locking element can preferably comprise an angle of more than 90° between two cross legs to avoid accumulation of dirt. According to a further advantageous embodiment of the positive locking elements, these can be embodied like claws, for example in the form of a claw clutch. The claws of the positive locking elements can extend in or opposite to the longitudinal direction and be engaged.

In a further advantageous embodiment of a tensioning device according to the invention, the securing element and/or the spindle body can comprise at least one retaining magnet which, in the securing position, connects the securing element and the spindle body by a magnetic retention force. The securing element is thus held in the securing position, where the magnetic non-positive connection between the securing element and the spindle body also functions when the tensioning device is dirty.

To permit a positive locking of the securing element in the securing position, in a further advantageous embodiment, the securing element and the spindle body can form at least one common through opening in the securing position. The through opening can be employed, for example, for receiving a locking bar or a padlock.

Preferably, both coupling elements are rotatably connected with the spindle body to permit a rotation of the spindle body with respect to the connected tension chains. To shorten the tensioning device on both sides upon actuation, for example by a lever connected with the spindle body, the tensioning device can preferably comprise two spindle threads running in opposite directions, where both coupling elements comprise a coupling thread which is each screwed with one spindle thread. As a rotation of the coupling elements is already impeded by connected tension chains on which a tensile stress acts, preferably only one of the coupling elements can be provided with a securing element according to the invention. By the one securing element preventing a relative rotation between the associated coupling element and the spindle body in the securing position, the spindle body can neither be rotated relative to the connected chain. The second coupling element can in turn be secured against rotation by the connected chain, so that the tensioning device cannot be unintentionally released.

In particular if the at least one coupling thread is formed by a threaded bolt, the spindle body can comprise at least one hollow space adjacent to the at least one spindle thread for receiving the threaded bolt. According to a further embodiment of the tensioning device which is also advantageous taken by itself, the hollow space can be provided with a service opening. As the service opening permits cleaning and also self-cleaning of the threads, one can do without a sealing of the spindle body common in prior art. The service opening can preferably be broader than the diameter of the received coupling thread to avoid contact between inner walls of the hollow space and the coupling thread and better permit dirt located at the thread to fall out. As an alternative, the spindle body can comprise external threads onto which internal threads of the coupling elements are screwed. In this case, the coupling elements can comprise a service opening for cleaning the threads of the spindle body.

In a further advantageous embodiment of the tensioning device, the spindle body can exhibit a U-shaped cross-section opening in the region of the hollow space transverse to the longitudinal direction. The opening of the U-shaped cross-section can form the service opening. Thus, a cross-section with stiffness against torsion is formed which does not even deform in case of major actuation moments that can be applied via an operating lever.

Preferably, the hollow space and/or the service opening are forged into the spindle body. The forging of the hollow space and the service opening can be in particular facilitated by the above mentioned U-shaped cross-section of the spindle body. The spindle body can in particular be manufactured by drop forging.

According to a further advantageous embodiment of a tensioning device according to the invention, retaining elements can be provided which are arranged between the securing element and the spindle body and connect the securing element and the spindle body in a form-fitting manner. The retaining elements can be embodied, for example, as screws or bolts and penetrate the securing element and the spindle body at least in sections to provide a form-fit.

The retaining elements can furthermore be embodied so that they can be hooked or locked into the securing element and/or the spindle body. To facilitate hooking or locking in, the retaining elements can be elastically expandable and/or compressible. Thus, the retaining elements can be elastically lengthened and/or compressed for connecting the securing element and the spindle body, and after the securing element and the spindle body have been connected, they can exert a retention force by their elastic pretension, so that an unintentional release of the retaining elements is prevented by their elastic elongation.

To facilitate the actuation of the tensioning device or ensure trouble-free actuation of the tensioning device, the securing element can be embodied so that it can be locked or fixed in the release position or in a parking position. Preferably, at least one retaining magnet can be provided which holds the securing element in the release position. The retaining magnet can be arranged in the coupling element for fixing the securing element at the coupling element or preferably at the securing element.

The retaining magnet can be arranged at the securing element and act on opposite sides of the securing element. Thus, the retaining magnet can serve to fix the securing element in the release position and to fix the securing element in the securing position.

As an alternative or in addition, the securing element can be held in the securing position and/or in the release position by means of at least one catching connection. For example, the securing element and/or the connecting member and/or the spindle body can comprise catching elements which can be elastically deflected and lock in counter-catching elements of the connecting member, the securing element and/or the spindle body. For positive locking, the securing element can, as an alternative or in addition, be provided with a securing screw which, in the securing position, engages in a retaining groove or retaining bore of the spindle body. The securing screw can be embodied, for example, as a knurled screw that can be screwed in transverse to a securing direction.

For a maximum amount of security and to exclude an accidental or unintentional adjustment of the tensioning device, the tensioning device can comprise a spring element which is arranged between the spindle body and the securing element and which holds the securing element in the securing position. The securing element can be embodied such that it can be deflected against the spring force into the release position to permit an adjustment of the tensioning device. To hold the securing element in the release position for assembly or for tensioning the tensioning device in the release position, the securing element can be connected with the spindle body via retaining magnets and/or catching connections in the release position.

In a further embodiment of a tensioning device according to the invention which is also advantageous by itself, the securing element can be embodied such that it can be inserted into the coupling element and/or the spindle body. If the coupling thread is embodied so that it can be screwed into the spindle body, at the coupling thread or at the end of the coupling element projecting into the spindle body, a through opening can be provided into which the securing element, which can be formed, for example, as a securing splint-pin or a bolt, can be inserted. In this embodiment, the spindle body preferably comprises a service opening through which the securing element can be inserted. To block a rotation of the coupling thread, the securing element can support itself at an internal surface of the spindle body or project from the service opening and support itself at the edge of the service opening in the inserted state.

As an alternative or in addition, in the hollow space of the spindle body, in which at least one screwed-in section of the coupling element can be received, at least one stop face can be arranged which forms a stop for an inserted securing element to block a rotation of the coupling element. To rotate the spindle body with respect to the connected coupling elements and thus shorten the tensioning device, the spindle body can comprise an operating section which is arranged between the coupling elements. Preferably, the spindle body extends at least in sections symmetrically away from both sides of the operating section. The spindle body can comprise two coupling sections each comprising a spindle thread and at least one hollow space, the coupling sections being arranged at both sides of the actuation section and symmetric to the operating section. The operating section can be embodied to be cylindrical to receive a ratchet lever. As an alternative, the operating section can comprise a through opening into which a rod-shaped operating lever can be inserted.

According to a further advantageous embodiment of a tensioning device according to the invention, the tensioning device can be provided with an operating lever which is mounted at the spindle body to be rotatable from an operating position to a securing position, where the operating lever comprises a retaining profile which, in the securing position, engages in a form-fitting manner with a retaining profile of a coupling element which is arranged adjacent in the securing position. Thus, the operating lever can form a securing element which advantageously automatically secures when the lever is turned after a tensioning operation.

According to a further embodiment the operating lever can comprise a tool interface. The tool interface can be formed, for example, as an opening with a standardized inner profile or as a prolongation with a standardized outer profile. For example, an opening with an inner polygon profile or a prolongation with an outer polygon profile can be provided. Preferably, an opening with a standardized square profile for receiving a commercially available torque wrench can be provided. The opening or the prolongation can extend in the longitudinal direction of the tensioning device and/or in the longitudinal direction of the spindle body.

To be able to connect the torque wrench outside the spindle body with the operating lever, the tool interface can be arranged at a distance to the spindle body at the operating lever. With a distance B of the tool interface from the longitudinal axis of the tensioning device or from an axis of revolution of the spindle body and a lever length C of the inserted torque wrench, for a given actuation moment TE for tensioning connected tie-down means, a torque TS=TE×C:B+C must thus be applied via the torque wrench.

Below, the invention will be illustrated by way of example by means of an exemplary embodiment with reference to the figures. Here, the described embodiment only represents a possible design which can be modified for the respective case of application. Individual features that are advantageous by themselves can be added to or omitted from the advantageous designs of the described embodiment according to the above description.

In the drawings:

FIG. 1 shows a schematic plan view of an embodiment of a tensioning device;

FIG. 2 shows a schematic sectional side view of the embodiment of FIG. 1 along the cutting plane II-II;

FIG. 3 shows a schematic sectional partial view of the tensioning device of FIG. 2 in which the securing element is in the securing position;

FIG. 15 shows a schematic sectional partial view of a sixth embodiment of a tensioning device according to the invention;

FIG. 16 shows a schematic sectional view according to the cutting plane XVI-XVI of FIG. 15;

FIG. 17 shows a schematic sectional view at the cutting plane XVII-XVII of FIG. 15;

FIG. 18 shows a schematic partial view of a seventh embodiment of a tensioning device according to the invention;

FIG. 19 shows a schematic sectional view at the cutting plane XIX-XIX of FIG. 18;

Figure 4:
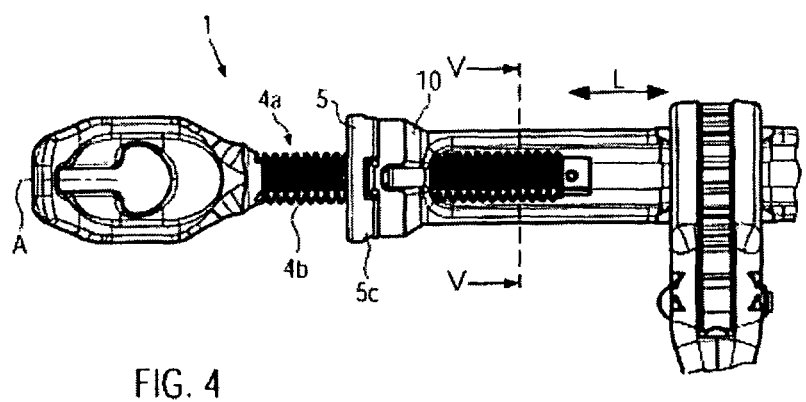
FIG. 4 shows a schematic partial view of the embodiment of FIG. 1.

First, the structure of a tensioning device according to the invention will be described with reference to the exemplary embodiment shown in FIG. 1.

The tensioning device 1 comprises a spindle body 2 which is screwed with coupling elements 3 and 4 at its opposite ends in the longitudinal direction L. A securing element 5 is arranged on the coupling element 4 such that it is movable in the longitudinal direction L and torsionally rigid. Furthermore, the tensioning device 1 comprises an operating lever 6, which extends centrically at the spindle body 2 transverse to the longitudinal direction L away from the spindle body 2.

The spindle body 2 has an essentially cylindrical shape and is provided with hollow spaces 7 which serve to receive threaded bolts 3a and 4a of the coupling elements 3 and 4. The hollow spaces 7 are arranged at both sides of an actuation section 8 shown in FIG. 2 at which the operating lever 6 embodied as a ratchet lever in the embodiment acts. The hollow spaces 7 are opened to the outside transverse to the longitudinal direction L by service openings 9. The service openings 9 are broader than the threaded bolts 3a, 4a and thus facilitate the removal of dirt at the threaded bolts 3a, 4a or at the coupling threads 3b, 4b formed by the threaded bolts 4a, 3a. Furthermore, the service openings 9 facilitate the assembly of securing bolts 12 which can be inserted into bores of the threaded bolts 4a to protect the threaded bolts 3a, 4a from being unscrewed.

The spindle body 2 is preferably made by casting and/or forging. The hollow spaces 7 are preferably forged into the spindle body 2 and are in particular made by drop forging.

The spindle body 2 is equipped with internal threads at opposite ends 2a, 2b into which one threaded bolt 3a, 4a each is screwed. The coupling threads 3b and 4b of the threaded bolts 3a, 4a and the (here not shown) spindle threads of the spindle body 2 are designed as metric trapezoidal threads. As an alternative, the spindle threads can be designed as metric V-threads.

At an end 2a pointing in the longitudinal direction L, the spindle body 2 is provided with a positive locking element 10. The positive locking element 10 is in sections designed to be complementary to a positive locking element of the securing element 5 to permit a torsionally rigid connection between the spindle body 2 and the securing element 5. A torsionally rigid connection between the threaded bolts 4a or the coupling thread 4b and the securing element 5 is in turn permitted by a positive locking member 4c on the threaded bolt 4a which extends in the longitudinal direction L over the total length of the threaded bolt 4a. A prolongation provided in a through opening of the securing element 5 for receiving the threaded bolt 4a and extending parallel to the positive locking member 4c prevents the securing element 5 from rotating about the threaded bolt 4a.

Both coupling elements 3, 4 have a single-piece form, where connecting members 3d, 4d are arranged at one end each of the threaded bolts 3a, 4a pointing away from the spindle body 2. The connecting members 3d, 4d can be embodied, for example, as shortening claws or shortening hooks. Instead of the connecting members 3d, 4d, closed eyes, eyes that can be closed by securing bolts, or fork heads can be alternatively provided.

By the hollow spaces 7 being dimensioned to be broader than the outer diameter of the coupling threads 3b, 4b, it is ensured that the threaded bolts 3a, 4a do not touch the inner wall of the spindle body 2 while they are being screwed into the spindle body 2, and/or that they do not exert any forces on the inner walls of the spindle body 2 which could lead to a blocking of the tensioning device 1.

The securing element 5 is guided on the threaded bolt 4a to be movable in a securing direction S and to be torsionally rigid. The threaded bolt 4a or the coupling thread 4b thus forms a guiding member by which the securing element 5 is guided in the securing direction S to a securing position in which a rotation of the coupling thread 4b about a longitudinal axis A of the coupling thread 4b is blocked with respect to the spindle thread. The longitudinal axis A forms an axis of symmetry of the coupling threads 3b and 4b and thus simultaneously an axis of revolution of the coupling element 3, 4 or the spindle body 2, respectively.

In the securing position, the securing element 5 forms a positive rigid body coupling between the coupling thread 4b and the spindle body 2, i.e. the section of the coupling element arranged between the coupling thread 4b and the spindle body 2 is rigid. To release the tensioning device 1, the securing element 5 is shifted on the threaded bolt 4a acting as guiding member in a release direction R which is opposed to the securing direction S.

The positive locking element 10 comprises prolongations 10b on which engagement faces 10c are arranged. In the securing position of the securing element 5, the engagement faces 10c abut against internal engagement faces 5e of the securing element 5 shown in FIG. 2.

In another possible embodiment of a tensioning device according to the invention, the operating lever 6 can function as guiding member by which a securing element 5' is guided from a release position in which the coupling thread 4 is rotatable with respect to the spindle thread, to a securing position in which the rotation of the coupling thread 4a with respect to the spindle thread is blocked in a form-fitting manner. The operating lever 6 can be provided with a joint G which permits to turn the lever into the securing direction S'. A securing element 5' arranged at the operating lever 6 which is symbolically represented in FIG. 1 by a dashed contour can thus be moved by turning the operating lever 6 into the securing direction S' onto the coupling element 4. In this manner, the operating lever 6 can be rotated from an operating position to a securing position, where the securing element 5' in the securing position engages in an adjacently arranged coupling element 4 in a form-fitting manner.

For example, the securing element 5' can be designed like a fork and grip around the threaded bolt 4a in a securing position in which the operating lever 6 is turned. At least one positive locking member 4c on the coupling thread 4b can abut against the securing element in the securing position, so that the threaded bolt 4a is secured against rotation. By turning back the operating lever 6 in the release direction R', the securing element 5' can be guided back from the securing position to the release position. The hinged operating lever 6 thus functions as guiding member for the securing element 5'.

FIG. 2 is a sectional side view of the exemplary embodiment of a device 1 according to the invention. Between the forged hollow spaces 7 of the spindle body 2, an operating section 8 is arranged which is gripped around by the operating lever 6 embodied as a ratchet lever. The hollow spaces 7 are each provided with knock-out openings 7a which permit a knocking out of the securing bolts 12 to disassemble the tensioning device 1. Furthermore, the knock-out openings 7a permit liquids to drain from the hollow spaces 7 when the service openings 9 face upwards.

The hollow spaces 7 are designed like a tub, where the cross-section of the hollow spaces 7 is reduced in a transverse direction Q. Thus, the design of the hollow spaces 7 is optimized for non-cutting manufacture. By the forging of the spindle body 2, the strength and/or stiffness of the spindle body 2 are essentially increased, so that no excessive torsion of the spindle body 2 occurs even if an actuation moment is applied by the operating lever 6.

The spindle body 2 comprises at its ends 2a, 2b pointing in or away from the longitudinal direction L spindle threads 11 in which the coupling threads 3b, 4b are received. The securing element 5 is shown in a release position in which the coupling thread 4b can be rotated with respect to the associated spindle thread 11. Not before the securing element 5, which is torsionally rigidly connected to the coupling thread 4b, is shifted in the securing direction S onto the positive locking element 10, a torsionally rigid connection between the coupling thread 4b and the spindle body 2 is formed which blocks an unintentional unscrewing of the coupling element 4 from the spindle body 2. The threaded bolt 4a here forms a retaining profile with the positive locking member 4c shown in FIG. 1 which engages in a retaining profile formed by an opening 5a of the securing element 5.

To also secure the coupling element 3 against being unscrewed from the spindle body 2, a positive locking element 10 and a securing element 5 can also be provided at the end 2b. Furthermore, the service openings 9 permit the assembly of the securing bolts 12 in the coupling threads 3b and/or 4b which can support themselves at the inner walls of the hollow space 7 pointing in the longitudinal direction L to protect the threaded bolts 3a and/or 4a against being unscrewed from the spindle body 2.

One or several bores 5b can be incorporated in the securing element 5 which in the securing position align with a bore 10a at the positive locking element 10 of the spindle body 2. Thus, in the securing position, the through opening 13 shown in FIG. 3 is formed into which a locking bar or a padlock can be inserted to secure the securing element 5 at the positive locking element 10 of the spindle body 2.

The engagement faces 5e abut against the engagement faces 10c of the positive locking element 10 behind the positive locking element 10 shown in FIG. 1 and are therefore concealed in the sectional view shown in FIG. 3.

FIG. 4 is a partial view of a plan view onto the tensioning device 1, where the securing element 5 is in the securing position. The securing element 5 comprises an edge 5c which, in the shown securing position, nearly aligns with the positive locking element 10 and on the inner sides of which the engagement faces 5e shown in FIG. 2 are arranged. Thus, the securing element 5 has an essentially hollow design in which the positive locking element 10 can be received.

Figure 5:
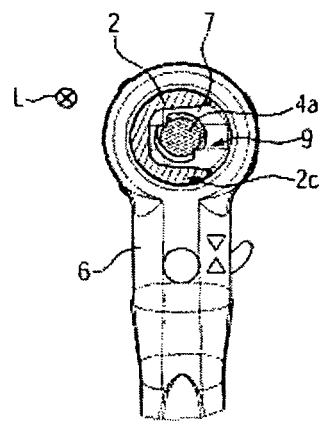
FIG. 5 shows a sectional side view according to the cutting plane V-V of FIG. 4.

FIG. 5 is a sectional view of the tensioning device 1 along the cutting plane V-V of FIG. 4. The spindle body 2 exhibits, in the region of the hollow space 7, an essentially U-shaped cross-section 2c which surrounds the threaded bolt 4a received in the hollow space 7. The U-shaped cross-section 2c opens transverse to the longitudinal direction L like a funnel. The width of the hollow space 7 increases starting from a bottom of the hollow space 7 towards the service opening 9.

Figure 6:
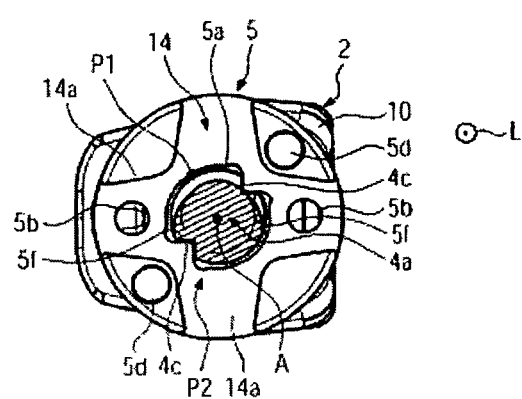
FIG. 6 shows a schematic sectional side view of the embodiment of FIG. 1 along the cutting plane VI-VI of FIG. 1.

FIG. 6 is a sectional view of the tensioning device 1 at the site VI-VI of FIG. 1. The securing element 5 forms a positive locking element 14 which is engaged with the positive locking element 10 of the spindle body 2 in the securing position. The positive locking element 14 is embodied in a cross-shape and in sections symmetric to a longitudinal axis A of the coupling thread 4b. Two cross legs 14a of the positive locking element 14 each include an angle which is ideally greater than 90° to prevent dirt particles from getting caught.

Due to its embodiment symmetric with respect to the longitudinal axis A, the positive locking element 14 can be placed onto the positive locking element 10 in a plurality of possible securing positions. By the cross-shaped design of the positive locking element 14, four different angular positions can be assumed by the positive locking element 14 which each have a pitch of 90°. To obtain smaller subdivisions of the angle, the positive locking element 14 can be embodied with a higher number of subdivisions. As an alternative to the cross-shaped design of the positive locking element 14, the positive locking element 14 can be embodied, for example, like a claw clutch where the prolongations engage in opposite recesses.

The positive locking member 4c of the coupling thread 4b abuts against a positive locking member 5f of the opening 5a. The pairing of the surfaces of the positive locking members 4c and 5f locks the threaded bolt 4a against rotation in the securing position. The opening 5a with the positive locking member 5f forms a retaining profile P2, the coupling thread 4b with the positive locking member 4c forms a retaining profile P1. The retaining profiles P1 and P2 each extend in the longitudinal direction L and are torsionally rigidly engaged. The retaining profiles P1 and P2 are embodied to be symmetric to a plane of symmetry (not shown) lying on the longitudinal axis A of the threaded bolt 4a to avoid jamming of the retaining profiles. Correspondingly, the positive locking member 4c and 5f are also each arranged to be symmetric to a plane of symmetry lying on the longitudinal axis A of the threaded bolt 4a.

To ensure a secure mounting of the securing element 5 in the securing position, the securing element 5 is provided with retaining magnets 5d which are arranged diagonally with respect to each other at the securing element and adhere to the positive locking element 10 of the spindle body 2 in the securing position.

Figure 7:
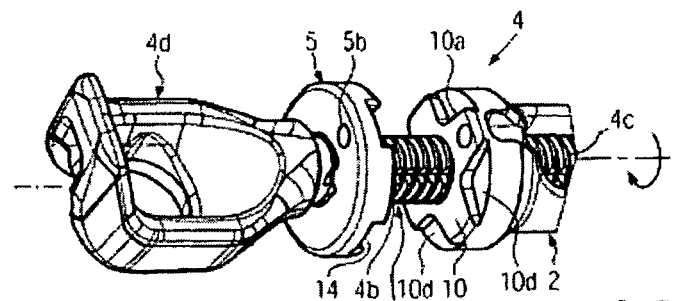
FIGS. 7 to 10 show schematic perspective partial views of an embodiment of the invention according to FIG. 1.

FIG. 7 is a perspective partial view of the end of the tensioning device of FIG. 1 at which the securing element 5 is arranged. The securing element 5 is located in a release position in which the threaded bolt 3a can be rotated with respect to the (here non-depicted) spindle thread of the spindle body 2. Furthermore, the securing element is in a parking position at the end of the threaded bolt 3a pointing away from the spindle body 2. If the securing element 5 is arranged in the parking position, the coupling thread 4b or the threaded bolt 4a of the coupling element 4 can be screwed into the spindle body 2 to a minimum span length of the coupling element 4.

If by rotating the spindle body 2, the coupling element 4 is screwed into the spindle body 2 to such an extent that an intended tension of the connected tensioning means is achieved, the spindle body 2 is rotated in a tensioning direction W or against a tensioning direction W until the positive locking element 14 formed by the securing element 5 is oriented according to the positive locking element 10 of the spindle body 2. Subsequently, the securing element 5 can be shifted in the direction of the spindle body 2 until it positively engages in the spindle body 2.

Figure 9:
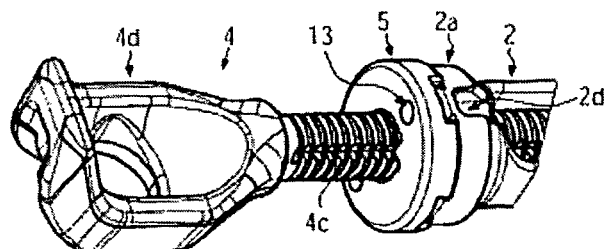

Furthermore, the spindle body 2 can be rotated, before the securing element 5 is transferred to the securing position, until one of the bores 5b of the securing element 5 aligns with a bore 10a of the spindle body 2. Thus, after the shifting of the securing element 5 into the securing position, the securing element 5 and the spindle body 2 form a through opening 13 shown in FIGS. 9 and 10 into which, for example, the padlock 15 shown in FIG. 10 can be inserted.

Figure 8:
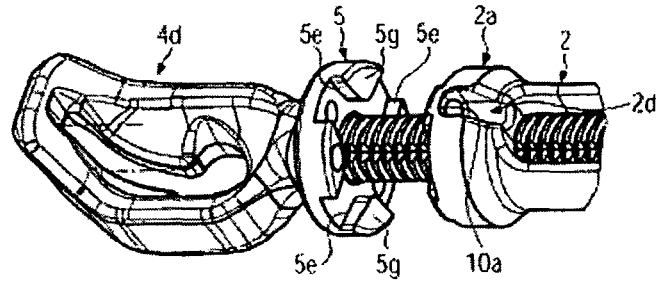

The inner side of the securing element 5 shown in FIG. 8 which faces the spindle body 2 has essentially triangular prolongations which extend in the direction of the spindle body 2 and at which the engagement faces 5e are arranged. The prolongations 5g of the securing element 5 are embodied to be complementary to the recesses 10d at the spindle body 2 shown in FIG. 7 and project into the recesses 10d in a form-fitting manner in the securing position of the securing element 5 shown in FIGS. 9 and 10.

Figure 10:
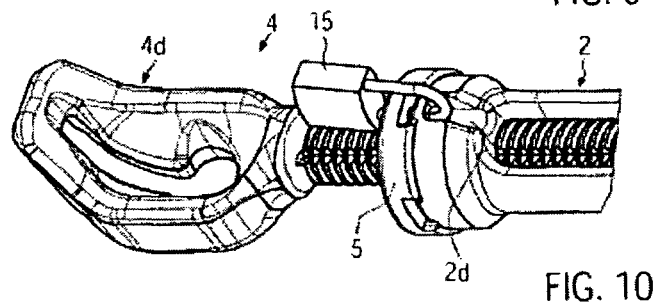

The essentially cylindrically shaped end 2a of the spindle body 2 pointing the securing element 5 comprises a channel-like indentation 2d which extends in the direction of the bore 10a arranged at its end. As shown in FIG. 10, the indentation 2d offers space for the shackle of a padlock 15 to facilitate the assembly of a padlock 15.

Figure 11:
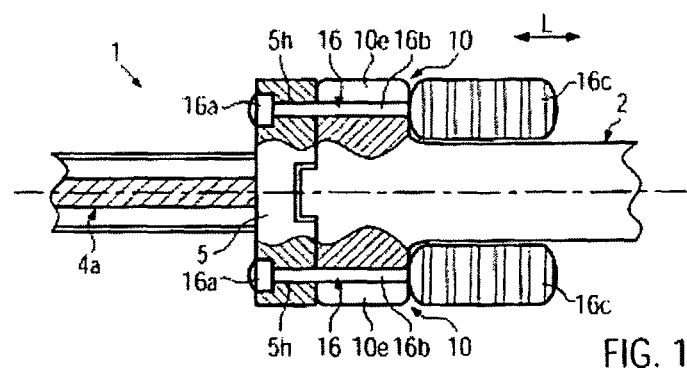
FIG. 11 shows a sectional partial view of a second embodiment of a tensioning device according to the invention.

FIG. 11 shows a further embodiment of a tensioning device according to the invention, wherein for elements whose function and construction correspond to the elements of the embodiment of FIGS. 1 to 10, the same reference numerals are used. To keep the description short, the differences to the embodiment of FIGS. 1 to 10 are discussed.

The securing element 5 is fixed to the spindle body 2 by means of retaining elements 16. The retaining elements 16 are inserted in the securing element 5 in a form-fitting manner. For example, the retaining elements 16 can, as shown in FIG. 11, be shaped at least in sections similar to a screw and be inserted in through openings 5h of the securing element 5. The retaining elements 16 can be provided with positive locking elements 16a which, in the securing position of the securing element 5, engage in the securing element 5 in a form-fitting manner. Further positive locking elements 16c of the retaining elements 16 rest on the positive locking element 10 of the spindle body 2 in a form-fitting manner in the securing position.

The positive locking elements 16a and 16c of the retaining elements 16 are connected to each other via a connecting section 16b. In the securing position of the tensioning device 1 shown in FIG. 11, the retaining elements 16 penetrate the securing element 5 and the adjacent positive locking element 10. To receive the connecting sections 16b, the positive locking element 10 of the spindle body 2 is provided with slot-like recesses 10e into which the connecting sections 16b can be inserted from outside.

Preferably, the retaining elements 16 are formed of an elastic material, for example an elastomer, to facilitate the insertion of the retaining elements 16 into the recesses 10e of the positive locking element 10 in the radial direction. Thus, a retaining element 16 can be elastically elongated during the fixing of the securing element 5 until it is possible to insert the connecting section 16b into the recess 10e or until the positive locking element 16c can grip behind the positive locking element 10. The positive locking elements 16c which, in the securing position, grip behind the positive locking element 10 of the spindle body 2 in the longitudinal direction L, can be embodied as grips with a profiled surface to facilitate the gripping of the retaining elements 16 for their elastic elongation.

Figure 12:
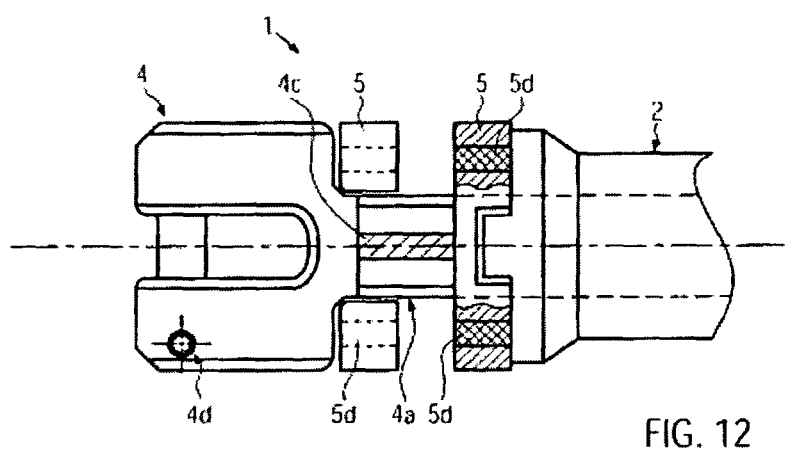
FIG. 12 shows a schematic partial view of a third embodiment of a tensioning device according to the invention.

FIG. 12 shows a third embodiment, where for elements whose function and construction correspond to the elements of the above-described embodiments, again the same reference numerals are used. The connecting member 4d of the tensioning device 1 is, by way of example, embodied as a fork head whose fork-like end can be closed with a bolt for connecting a chain.

The securing element 5 movably arranged on the threaded bolt 4a of the coupling element 4 is provided with retaining magnets 5d which act at opposite ends of the securing element 5. While in a release position of the securing element 5, which corresponds to a parking position, the securing element 5 abuts against the coupling connecting member 4d and is held by the retaining magnets 5d at the connecting member 4d, the retaining magnets 5d in the securing position act on the spindle body 2 and thus fix the securing element 5 at the spindle body 2. The securing element 5 is represented in a dashed line in the release or parking position, and in solid lines in the securing position.

By the securing element 5 being held at the connecting element 4d in the release position, the spindle body 2 can be rotated without any disturbances while the connected tie-down means are being tensioned, while no blocking of the spindle body can occur due to the securing element's 5 getting out of place.

Figure 13:
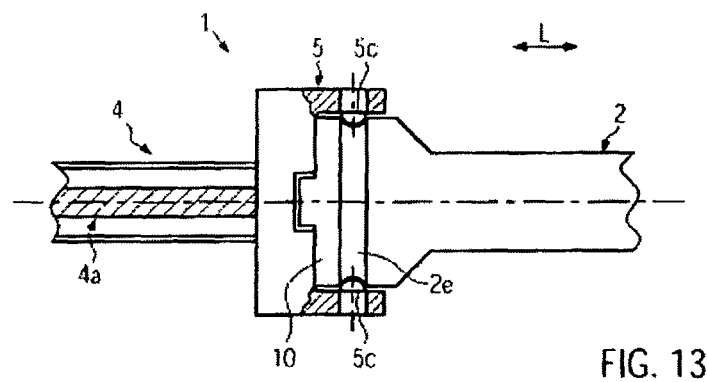
FIG. 13 shows a schematic partial view of a fourth embodiment of a tensioning device according to the invention.

FIG. 13 shows a fourth embodiment where for elements having the same function and the same construction, again the same reference numerals are used. In the shown embodiment, the securing element 5 comprises elastically deflectable catching elements 5i which, in the shown securing position of the securing element 5, lock into place in a counter-catch 2e of the spindle body 2 embodied as catching groove. The catching elements 5i lock into place in the counter-catch 2e in a radial direction and transverse to the longitudinal direction L and thus fix the securing element 5 guided on the threaded bolt 4a in the securing position.

The catching elements 5i are preferably provided with spring elements which press the catching elements 5i into a catch position in which the catching elements 5i are pressed out of the securing element 5 or engage in the counter-catch 2e. The catching elements 5i can be movably guided in bores of the securing element 5. For example, blind hole bores can be provided, where spring elements are inserted on the bottom of them to subsequently press catching elements inserted in the bores into the direction of the opening of the blind hole bore.

Figure 14:
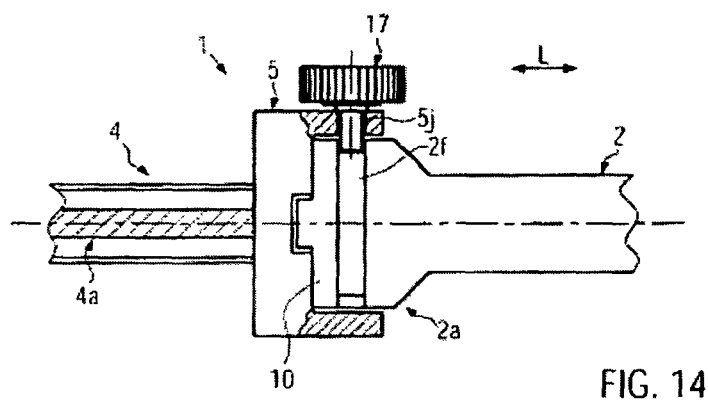
FIG. 14 shows a sectional partial view of a fifth embodiment of a tensioning device according to the invention.

FIG. 14 shows a fifth embodiment of a tensioning device according to the invention, where for the sake of simplicity for elements whose function and construction correspond to the elements of the above-described embodiments, again the same reference numerals are used.

The securing element 5 is provided with a continuous tapped bore 5j into which a securing screw 17 is screwed. The securing screw 17 penetrates the securing element 5 and extends in a holding groove at the end 2a of the spindle body 2 extending around the spindle body transverse to the longitudinal direction L. Instead of the holding groove 2f, one or a plurality of bores can also be provided into which the end of the securing screw 17 can be inserted.

FIGS. 15 to 17 show a sixth embodiment of a tensioning device according to the invention, where for elements whose function and construction correspond to the elements of the above-described embodiment, the same reference numerals are used.

The securing element 5 of FIG. 15 is, as in the previous embodiments, guided on the coupling thread 4b to be movable in the longitudinal direction L and torsionally rigid and can be moved between a release position in which the coupling thread 4b can be rotated with respect to the spindle thread, and a securing position in which a rotation of the coupling thread is blocked. The securing element 5 is shown in an intermediate position between the securing position and the release position.

A spring element 18 which acts between the spindle body 2 and the securing element 5 presses the securing element 5 into the securing position. In the securing position, the securing element 5 abuts at its inner side against a stop element 19 which is shown as a bolt by way of example. The bolt-like stop element 19 is inserted in a bore of the spindle body 2 transverse to the longitudinal direction L. To be able to insert the stop element 19 into the bolt bore 2h, the securing element 5 comprises a mounting opening 5k through which the bolt bore 2h is accessible from outside when the securing element 5 is mounted.

By shifting the securing element 5 in the direction of the spindle body 2, the securing element 5 can be transferred to a release position in which the positive locking elements 14 are arranged outside the positive locking element 10. To arrest the securing element 5 in the release position, a retaining magnet 2g is inserted in the spindle body 2 and holds the securing element 5 against the spring force of the spring element 18 in the release position. In the release position, the securing element 5 preferably abuts against the retaining magnets 2g. Thus, the positive locking elements 14 are in the release position no longer engaged with the indentations 10f. The securing element 5 can thus rotate with the coupling element 5 with respect to the spindle body 2. As an alternative, between the retaining magnet 2g and the securing element 5, an air gap can remain to reduce the frictional resistance of the securing element 5 during a tensioning operation.

As shown in FIG. 16, positive locking elements 14 of the securing element 5 are embodied similar to an internal toothing. The positive locking elements 14 form prolongations extending in the longitudinal direction L which engage in indentations 10f of the positive locking element 10. Across the periphery of the positive locking element 10, a plurality of indentations 10f is arranged. The indentations 10f form a toothed ring with the elevations of the positive locking element 10 remaining between the indentations 10f. Due to the plurality of indentations 10f across the periphery of the positive locking element 10, the securing element 5 can be placed on the positive locking element 10 in a plurality of angular positions.

The securing element 5 is provided with a through opening 5a which serves to receive the threaded bolt 4a and is, as the threaded bolt 4a or the coupling thread 4b, provided with a positive locking member 5f. The positive locking members 4c of the coupling thread 4b and 5f of the opening 4a, which are oriented parallel with respect to each other, form a torsionally rigid, movable guidance of the coupling element 5 on the threaded bolt 4a. Thus, the securing element 5 held in the release position by the retaining magnet 2g rotates along with the threaded bolt 4a.

FIG. 18 and FIG. 19 show a seventh embodiment of a tensioning device according to the invention. For elements whose function and construction correspond to the elements of the previous embodiments, the same reference numerals are used.

In the embodiment of FIGS. 18 and 19, the operating lever 6 forms the securing element 5. The operating lever 6 is connected to the spindle body 2 via a hinged bearing (not shown here). By turning the operating lever 6 after rotation of the spindle body 2 towards the coupling element 4, the securing element 5 is transferred to the securing position. To this end, the securing element 5, which is arranged, by way of example, at the end of the operating lever 6, comprises opposed positive locking members 5f in an opening 5a which, in the securing position, rest on opposed positive locking members 4c of the threaded bolt 4a. Thus, a rotation of the coupling element 4 with respect to the spindle body 2 is blocked by the operating lever 6.

To stabilize the position of the operating lever 6 in the securing position, the positive locking element 10 can be equipped with indentations 10f whose inner surfaces are adapted to the outer contours of the operating lever 6 and thus offer lateral supporting surfaces for the operating lever 6.

Figure 21:
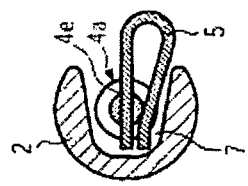
FIG. 21 shows a schematic sectional view at the point XXI-XXI of FIG. 20.
Figure 20:
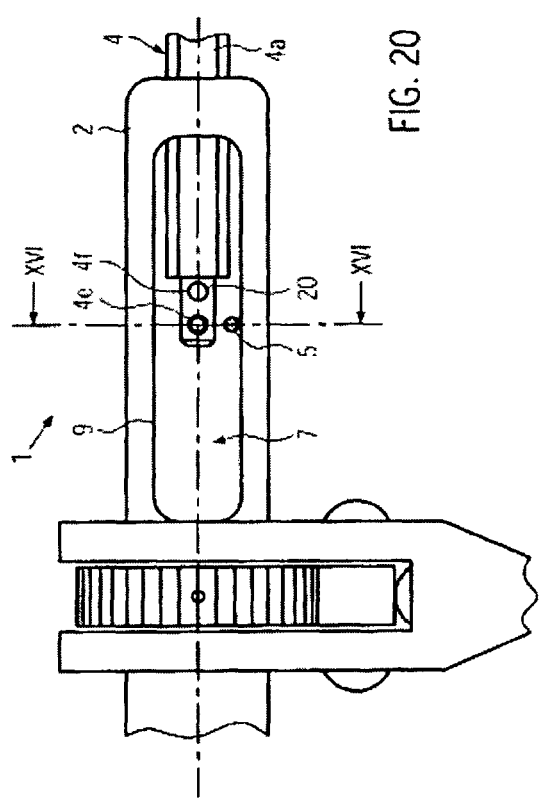
FIG. 20 shows a schematic partial view of an eighth embodiment of a tensioning device according to the invention.

FIGS. 20 and 21 show an eighth embodiment of a tensioning device 1 according to the invention.

The securing element 5 is designed as securing splint-pin. At an end of the coupling element 4 projecting into the spindle body 2, a through opening 4e is arranged which serves to continue the securing element 5 and receive it in a form-fitting manner. The hollow space 7 in which the end of the coupling element 4 is received is accessible via the service opening 9 of the spindle body 2. If now the coupling element is to be blocked in a certain tensioning position with respect to the spindle body 2 in a torsionally rigid manner, the securing element 5 can, as shown in FIG. 21, be inserted into the through opening 4e. Due to its length which is clearly longer than the width of the hollow space 7, the securing element 5 abuts against the inner walls of the hollow space 7 in case of an unintentional rotation of the coupling element 4 with respect to the spindle body 2.

Furthermore, the tensioning device can comprise a screw out protection. The screw out protection can be formed by a spring bolt 20 which can be inserted into another through opening 4f of the coupling element 4. When the spring bolt 20 is inserted, the coupling element 4 can be screwed out of the spindle body 2 until it reaches a position in which the spring bolt 20 abuts against the inner wall of the hollow space 7. Thus, it is excluded to completely screw the coupling element 4 out of the spindle body 2.

Figure 22:
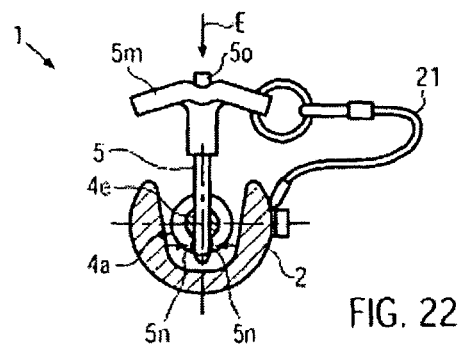
FIG. 22 shows a schematic sectional view of a ninth embodiment of a tensioning device according to the invention.

FIG. 22 shows a ninth embodiment of a tensioning device according to the invention, wherein for elements whose function and construction correspond to the elements of the embodiment of FIGS. 1 to 21, the same reference numerals are used.

As in the embodiment of FIGS. 20 and 21, the securing element 5 is designed such that it can be inserted into the threaded bolt 4a. The securing element 5 is designed like a bolt and provided with a grip 5m. The grip 5m has an ergonomic design and offers surfaces for pressing in or pulling out the securing element 5.

At its bottom side, the securing element 5 is equipped with locking elements 5n which extend transverse to a direction of insertion E and thus block a pulling out of the securing element 5 from the through opening 4e of the threaded bolt 4a. The locking elements 5n can be embodied to be unlockable via an operating member 5o. For example, the locking elements 5n can be pulled into the securing element 5 by pressing the operating member 5o to release a movement of the securing element 5 opposite to the direction of insertion E.

The securing element 5 can be captively connected to the tensioning device 1 via a loss prevention device 21. The loss prevention device 21 can e.g. be designed as a tape which is passed through an opening of the securing element 5 and is for example connected to the spindle body 2 via a screwed connection.

Figure 23:
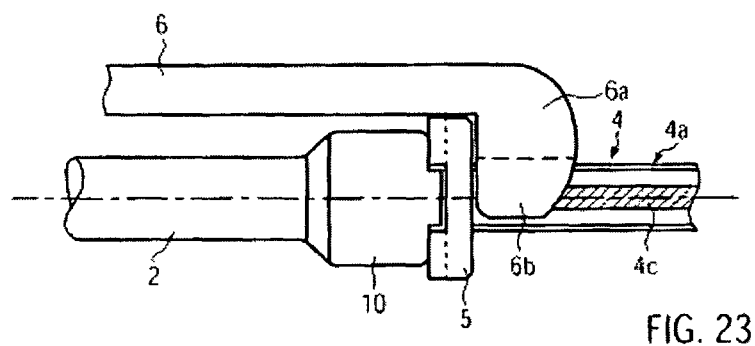
FIG. 23 shows a schematic partial view of a tenth embodiment of a tensioning device according to the invention.

FIG. 23 is a tenth embodiment of a tensioning device according to the invention. The operating lever 6 is, as in the embodiment of FIG. 18, rotatably fixed to the spindle body 2. After the securing element 5 has been shifted in a securing place, the lever can also be transferred to a securing position by turning it in the direction of the coupling element 4.

The lever 6 has a fork-shaped end 6a which, in the securing position, grips behind the securing element 5 and thus prevents a displacement of the securing element 5 to the release position. In the securing position of the operating element 6, two fork legs 6b of the fork-shaped end 6a are arranged at opposite sides of the threaded bolt 4a. In addition to the rotation protection realized by the securing element 5, the fork-shaped end 6a of the operating lever 6 can form a rotation protection by surfaces of the fork-shaped ends 6b pointing inwards resting on positive locking members of the threaded bolt 4a designed as flattenings.

Figure 24:
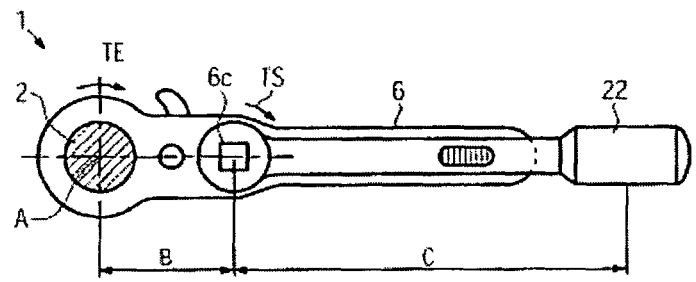
FIG. 24 shows a schematic side view of an operating lever for a tensioning device according to the invention.

FIG. 24 shows another possible embodiment of the operating lever 6 which permits the adjustment of a certain tension in the tensioning device. To this end, the operating lever 6 comprises a tool interface 6c which is preferably embodied as standardized square to receive a commercially available torque wrench 22. To be able to connect the torque wrench 22 outside the spindle body 2 with the operating lever 6, the tool interface 6c is spaced apart from the spindle body 2 by a distance B. With a distance B of the tool interface 6c from the longitudinal axis A of the threaded bolts 4a and a lever length C of the inserted torque wrench 22, one thus has to apply a torque $TS = TE \times C:B+C$ via the torque wrench 22 for an actuation moment TE.

Figure 25:
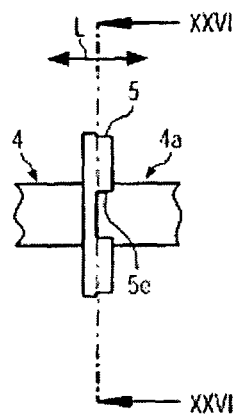
FIG. 25 shows a schematic partial view of an eleventh embodiment of a tensioning device according to the invention.
Figure 26:
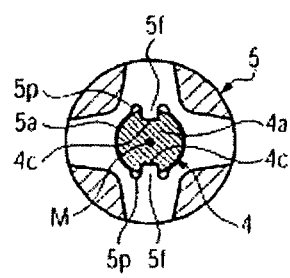
FIG. 26 shows a schematic sectional partial view according to the cutting plane XXVI-XXVI of FIG. 25.

FIGS. 25 and 26 show an eleventh embodiment with a securing element 5 movably and torsionally rigidly guided on the coupling element 4. For elements whose function and construction correspond to the elements of the previous embodiments, the same reference numerals are used. To keep the description short, here the differences to the embodiment of FIGS. 1 to 10 are discussed.

The positive locking members 5f of the coupling element 5 are shaped as tongue-like prolongations which engage in complementarily designed positive locking members 4c of the coupling element 4 extending in the longitudinal direction L and shaped as recesses. The positive locking members 4c and 5f each have an essentially rectangular cross-section. To reduce the notch effect arising due to the positive locking members 5f, in particular at the transition between the circular sections of the opening 5a and the tongue- or flap-like positive locking member 5f, at both sides of the positive locking members 5f, relieving notches 5b are arranged whose enlarged radius reduces occurring stress peaks.

Figure 27:
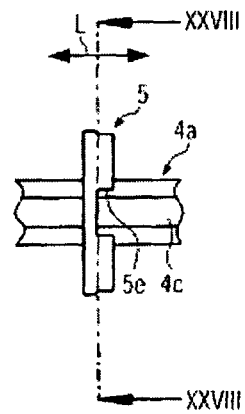
FIG. 27 shows a schematic partial view of a twelfth embodiment of a tensioning device according to the invention.
Figure 28:
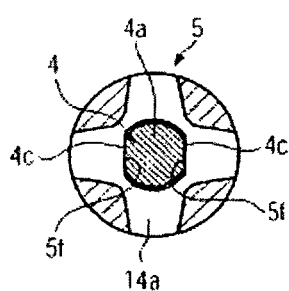
FIG. 28 shows a schematic sectional view of the embodiment of FIG. 27 at the point XXVIII-XXVIII.

FIGS. 27 and 28 show a twelfth embodiment of a securing element 5 held on the coupling element 4 to be movable in the longitudinal direction L.

The positive locking members 5f of the securing element 5 are designed as flattenings which abut against positive locking members 4c of the coupling element 4 also embodied as flattenings. The positive locking members 4c embodied as flattenings are arranged at opposite sides of the threaded bolt 4a where the flattenings which are embodied to be plain extend parallel to each other. The cross-sectional profile of the threaded bolt 4a is thus altogether embodied to be point-symmetric about its center M.

The invention claimed is:

1. Tensioning device (1) for chains with a spindle body (2) which is provided with at least one spindle thread (11), with at least two coupling elements (3, 4) that are connected to the spindle body (2), wherein at least one coupling element (3, 4) comprises a coupling thread (3b, 4b) screwed to the spindle thread (11), and with a securing element (5) which can be transferred from a release position, in which the coupling thread (3b, 4b) can be rotated with respect to the spindle thread (11), to a securing position, in which a rotation of the coupling thread (3b, 4b) with respect to the spindle body (2) is blocked in a form-fitting manner, wherein the securing element (5) creates a positive rigid body coupling between the at least one coupling element (3, 4) provided with a coupling thread (3b, 4b) and the spindle body (2) in the securing position, wherein the securing element (5) is, in the release position, arranged on said at least one coupling element (3, 4) or the spindle body such that it is torsionally rigid and movable in a longitudinal direction (L), wherein the securing element (5) comprises at least one positive locking element (14) which, in the securing position, is positively engaged with a complementary embodied positive locking element (10) of the spindle body (2) or the at least one coupling element, said positive locking element (14) of said securing element (5) and said positive locking element (10) of said spindle body (2) or the at least one coupling element being configured so as to prevent any rotational movement of said at least one coupling element relative to said spindle body in said securing position, wherein the securing element (5) and/or the spindle body (2) or the at least one coupling element comprise at least one retaining magnet (5d) which connects the securing element (5) and the spindle body (2) or the at least one coupling element by a magnetic holding force in the securing position.

2. Tensioning device (1) according to claim 1, characterized in that the securing element (5) is movably guided at the tensioning device (1) between the securing position and the release position.

3. Tensioning device (1) according to claim 2, characterized in that the securing element (5) is connected to the coupling element (3, 4) in a torsionally rigid manner at least in the securing position.

4. Tensioning device (1) according to claim 1, characterized in that the securing element (5) is connected to the coupling element (3, 4) in a torsionally rigid manner at least in the securing position.

5. Tensioning device (1) according to claim 1, characterized in that the coupling thread (4b) and the securing element (5) comprise retaining profiles (P1, P2) which extend in the longitudinal direction (L), are not circularly symmetric and are embodied to be complementary.

6. Tensioning device (1) according to claim 5, characterized in that the retaining profile (P1) of the coupling thread (4b) is formed by a threaded bolt (4a), and the retaining profile (P2) of the securing element (5) is formed by an opening (5a) receiving the threaded bolt.

7. Tensioning device (1) according to claim 1, characterized in that the securing element (5) and the spindle body (2) each comprise at least one engagement face (5e, 10c), where the engagement faces (5e, 10c) extend parallel to each other and inclined with respect to the longitudinal direction (L) and rest one upon the other in the securing position.

8. Tensioning device (1) according to claim 1, characterized in that the tensioning device (1) comprises two spindle threads (11) running in opposite directions, wherein both coupling elements (3, 4) comprise a coupling thread (3b, 4b) which is screwed with one spindle thread (11) each.

9. Tensioning device (1) according to claim 1, characterized in that at least one coupling element (3, 4) comprises a threaded bolt (3a, 4a) which comprises the coupling thread (3b, 4b), and that the spindle body (2) comprises at least one hollow space (7) for receiving the threaded bolt (3a, 4a) which is provided with a service opening (9).

10. Tensioning device (1) according to claim 9, characterized in that the spindle body (2) exhibits, in the region of the hollow space (7), a U-shaped cross-section (2c) opening transverse to the longitudinal direction (L).

11. Tensioning device (1) according to claim 10, characterized in that the hollow space (7) and/or the service opening (9) are cast, and/or forged into the spindle body (2).

12. Tensioning device (1) according to claim 9, characterized in that the hollow space (7) and/or the service opening (9) are cast, and/or forged into the spindle body (2).

13. Tensioning device (1) according to claim 1, characterized in that the spindle body (2) comprises an actuation section (8) and at least in sections extends symmetrically away from both sides of the actuation section (8).

14. Tensioning device (1) according to claim 1, characterized in that the tensioning device (1) is provided with an operating lever (6) which is mounted at the spindle body (2) to be rotatable from an operating position to a securing position, wherein the securing element (5, 5') is arranged at the operating lever (6) and positively engages in an adjacently arranged coupling element (4) in the securing position.

15. Tensioning device (1) according to claim 1, characterized in that the tensioning device (1) is provided with an operating lever (6) which comprises a tool interface (6c) by which an actuation moment (TE) can be exerted on the operating lever (6).

16. Tensioning device (1) according to claim 1, wherein the spindle body and the at least one coupling element are arranged to define at least one hollow space (7) therebetween; the spindle body (2) or the at least one coupling element defining a service opening (9) therein for providing access to said hollow space; and wherein the spindle body (2) or the at least one coupling element defining the service opening exhibits, in the region of the hollow space (7), a U-shaped cross-section (2c) opening transverse to the longitudinal direction (L) of extension of said tensioning device.

17. Tensioning device (1) according to claim 16, characterized in that the hollow space (7) and/or the service opening (9) are cast, and/or forged into the spindle body (2).

18. Tensioning device (1) according to claim 16, characterized in that the service opening (9) is broader than the diameter of the received coupling thread.

19. Tensioning device (1) for chains, said tensioning device comprising a spindle body (2) provided with at least one spindle thread (11), and at least two coupling elements (3,4) that are connected to the spindle body (2), wherein at least one said coupling element (3,4) has a coupling thread (3b, 4b) screwed to the spindle thread (11)₁ and a securing element (5) which can be transferred from a release position, in which the coupling thread (3b, 4b) of said at least one coupling element (3,4) is rotatable with respect to the spindle thread (11), to a securing position, in which rotation of the coupling thread (3b, 4b) of said at least one coupling element (3,4) with respect to the spindle thread is blocked in a form fitting manner; wherein the securing element (5) creates a positive rigid body coupling between the at least one coupling element (3,4) having the coupling thread (3b, 4b) and the spindle body (2) in the securing position; wherein the securing element (5) and the spindle body (2) or the at least one coupling element form at least one common through opening (13) in the securing position, said through opening; being sufficiently wide so as to removably receive a locking element therein, said through opening being accessible through both the securing element (5) and the spindle body (2) or the at least one coupling element, said through opening extending in a longitudinal direction substantially parallel to the longitudinal direction of extension of the spindle body.

20. Tensioning device (1) according to claim 19, wherein the spindle body (2) and the at least one coupling element are arranged to define at least one hollow space (7) therebetween; the spindle body or the at least one coupling element defining a service opening therein for providing access to said hollow space; and wherein the spindle body (2) or the at least one coupling element defining the service opening exhibits, in the region of the hollow space (7), a U-shaped cross-section (2*c*) opening transverse to the longitudinal direction (L) of extension of said tensioning device.

\* \* \* \* \*

UNITED STATES PATENT AND TRADEMARK OFFICE
CERTIFICATE OF CORRECTION

PATENT NO. : 9,103,405 B2
APPLICATION NO. : 13/066014
DATED : August 11, 2015
INVENTOR(S) : Smetz et al.

It is certified that error appears in the above-identified patent and that said Letters Patent is hereby corrected as shown below:

In the claims

Column 18, Line 54 Claim 19, Line 19 Delete ";".

Signed and Sealed this
Sixteenth Day of August, 2016

Michelle K. Lee
*Director of the United States Patent and Trademark Office*